(12) United States Patent
Wackerl et al.

(10) Patent No.: US 7,664,581 B2
(45) Date of Patent: Feb. 16, 2010

(54) METHOD AND DEVICE FOR CHANGING OVER A FIRST MODE OF A CONTROL DEVICE TO A SECOND MODE, VIA A DATA BUS

(75) Inventors: Oliver Wackerl, Kirchheim an der Teck (DE); Ruediger Jordan, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 722 days.

(21) Appl. No.: 10/959,439

(22) Filed: Oct. 5, 2004

(65) Prior Publication Data
US 2005/0093674 A1      May 5, 2005

(30) Foreign Application Priority Data
Oct. 16, 2003   (DE)   ............................... 103 48 255

(51) Int. Cl.
    G06F 7/00    (2006.01)
(52) U.S. Cl. .......................... 701/36; 701/115; 726/17; 370/357
(58) Field of Classification Search .................. 701/29, 701/31, 36, 115; 714/718, E11.17; 455/500, 455/515; 725/25; 726/2, 17, 27; 713/168, 713/193; 370/357
See application file for complete search history.

(56) References Cited

U.S. PATENT DOCUMENTS

| | | | |
|---|---|---|---|
| 5,555,498 A | | 9/1996 | Berra et al. |
| 5,778,316 A | * | 7/1998 | Persson et al. ............... 455/434 |
| 6,430,716 B1 | * | 8/2002 | Hiramatsu ................... 714/718 |
| 6,965,816 B2 | * | 11/2005 | Walker .......................... 701/16 |
| 7,139,660 B2 | * | 11/2006 | Sarkar et al. ................. 701/200 |
| 7,233,857 B2 | * | 6/2007 | Cahoon ....................... 701/115 |
| 7,346,370 B2 | * | 3/2008 | Spaur et al. ............... 455/556.1 |
| 7,363,129 B1 | * | 4/2008 | Barnicle et al. ................ 701/29 |
| 7,502,353 B2 | * | 3/2009 | Bolz ........................... 370/338 |
| 7,519,455 B2 | * | 4/2009 | Weiss et al. ..................... 701/2 |

(Continued)

FOREIGN PATENT DOCUMENTS

CN    101055648 A   * 10/2007

(Continued)

OTHER PUBLICATIONS

Research on Vehicular Ad Hoc Networks; Yue Liu; Jun Bi; Ju Yang; Control and Decision Conference, 2009. CCDC '09. Chinese, Jun. 17-19, 2009 pp. 4430-4435, Digital Object Identifier 10.1109/CCDC.2009.5192343.*

(Continued)

*Primary Examiner*—Cuong H Nguyen
(74) *Attorney, Agent, or Firm*—Kenyon & Kenyon LLP

(57) ABSTRACT

A method and a system for switching between a first operating mode and a second operating mode of a target control device connected to a data bus are provided. After activation of the target control device, a test device generates a predefined signal to be transmitted on the data bus, the predefined signal having a predefined frequency and a predefined pulse-duty factor. The target control device is switched from the first operating mode to the second operating mode in response to detecting the predefined signal transmitted on the data bus.

16 Claims, 1 Drawing Sheet

U.S. PATENT DOCUMENTS

| | | | | |
|---|---|---|---|---|
| 2002/0095673 | A1* | 7/2002 | Leung et al. | 725/25 |
| 2005/0154500 | A1* | 7/2005 | Sonnenrein et al. | 701/1 |
| 2006/0015221 | A1* | 1/2006 | Sarkar et al. | 701/2 |
| 2006/0161320 | A1* | 7/2006 | Cahoon | 701/36 |
| 2006/0235580 | A1* | 10/2006 | Weiss et al. | 701/2 |
| 2008/0022395 | A1* | 1/2008 | Holtzman et al. | 726/19 |
| 2008/0022413 | A1* | 1/2008 | Holtzman et al. | 726/27 |
| 2008/0034440 | A1* | 2/2008 | Holtzman et al. | 726/27 |
| 2008/0195299 | A1* | 8/2008 | Barnicle et al. | 701/115 |
| 2008/0200209 | A1* | 8/2008 | Cahoon | 455/557 |
| 2009/0198410 | A1* | 8/2009 | Miller et al. | 701/36 |

FOREIGN PATENT DOCUMENTS

| | | |
|---|---|---|
| DE | 195 40 671 | 9/1996 |
| DE | 102006035803 A1 * | 2/2008 |
| EP | 0 903 271 | 3/1999 |

OTHER PUBLICATIONS

An Automotive Security System for Anti-theft; Huaqun Guo; Cheng, H.S.; Wu, Y.D.; Ang, J.J.; Tao, F.; Venkatasubramanian, A.K.; Kwek, C.H.; Liow, L.H.; Networks, 2009. ICN '09. Eighth International Conference on; Mar. 1-6, 2009 pp. 421-426 Digital Object Identifier 10.1109/ICN.2009.28.*

Systematic Security and Timeliness Tradeoffs in Real-Time Embedded Systems; Kang, K.-D.; Son, S.H.; Embedded and Real-Time Computing Systems and Applications, 2006. Proceedings. 12th IEEE International Conference on, 0-0 0 pp. 183-189 Digital Object Identifier 10.1109/RTCSA.2006.59.*

Mobility Pattern Aware Routing for Heterogeneous Vehicular Networks; Chia-Chen Hung; Chan, H.; Wu, E.H.-K.; Wireless Communications and Networking Conference, 2008. WCNC 2008. IEEE; Mar. 31, 2008-Apr. 3, 2008 pp. 2200-2205 Digital Object Identifier 10.1109/WCNC.2008.389.*

A driver behavior evaluation system with IVC technology; Hung, J.C.; Wen-Hsing Kao; Hsu, V.; Ubi-Media Computing, 2008 First IEEE International Conference on; Jul. 31, 2008-Aug. 1, 2008 pp. 474-477; Digital Object Identifier 10.1109/UMEDIA.2008.4570938.*

A new environment for distributed multiple vehicles dynamics control and simulation; Raimondi, F.M.; Ciancimino, L.S.; Intelligent Transportation Systems Conference, 2007. ITSC 2007. IEEE; Sep. 30, 2007-Oct. 3, 2007 pp. 842-847 Digital Object Identifier 10.1109/ITSC.2007.4357631.*

Secure software upload in an intelligent vehicle via wireless communication links; Mahmud, S.M.; Shanker, S.; Hossain, I.; Intelligent Vehicles Symposium, 2005. Proceedings. IEEE; Jun. 6-8, 2005 pp. 588-593; Digital Object Identifier 10.1109/IVS.2005.1505167.*

Towards a non-contact driver-vehicle interface; McAllister, G.; McKenna, S.J.; Ricketts, I.W.; Intelligent Transportation Systems, 2000. Proceedings. 2000 IEEE; Oct. 1-3, 2000 pp. 58-63; Digital Object Identifier 10.1109/ITSC.2000.881018.*

* cited by examiner

METHOD AND DEVICE FOR CHANGING OVER A FIRST MODE OF A CONTROL DEVICE TO A SECOND MODE, VIA A DATA BUS

FIELD OF THE INVENTION

The present invention generally relates to a method and a device for changing over a mode of a control device, via a data bus, and particularly relates to a method and a device for changing between a standard operating mode and a factory test mode of a motor-vehicle control unit, via a CAN bus.

BACKGROUND INFORMATION

As either a part of the manufacturing process or after completion of the manufacturing process, motor-vehicle control units, which include micro-controllers, for example, must be tested for their functionality at the factory. To this end, special software functions, which are only used to test the control units at the factory and are no longer necessary during later operation by the actual user, must be provided in the control unit. Such special functions (or test functions) may not be executable during the future operation of the control units, since unwanted behavior of the control unit could otherwise be produced. In a motor vehicle, this would produce, for example, an unacceptable safety risk during normal operation, e.g., when control units of safety-relevant components such as the drive system or the brake system would execute manufacturer test functions.

Because of this, a special test or factory mode is generally defined, which is only implemented after a so-called entry condition is satisfied. In the case of engine control units, it is known that such an entry condition may be generated by applying predefined signals at input pins or terminals for the connection of sensors. In this context, the signals applied are signals which may not occur during normal operation of the engine. In this manner, it is ensured that an inadvertent jump into the test mode may not occur during normal operation.

In the above-explained design approach, it is disadvantageous that, in addition to the communication lines such as CAN lines or K lines, additional connector pins such as sensor connections are necessary for applying the signals for providing the entry condition. However, control units, which only have a supply-voltage connection and data-bus connection, do not provide any additional control-unit pins, via which signals may be applied to provide an entry condition to the control unit to be tested at the factory.

SUMMARY OF THE INVENTION

An example embodiment of the present invention for changing over a mode of a control device via a data bus has the advantage over the known art that, apart from the data-bus communication connection, no additional control-unit pins are necessary to implement the change over, and that a reliable entry condition for a test mode may be generated in a cost-effective manner. Due to the predefined characteristics of the entry condition, a very high level of protection is provided against an accidentally occurring entry condition for the test mode. As protection against misuse, there is also the option of using an authentication method, such as the seed & key method, in order to authorize a tester or test device of the manufacturer to test and/or program the control unit. Therefore, a two-stage safety measure may be provided, which is based on both software algorithms and physical quantities.

In accordance with the present invention, a signal is applied to a data bus, e.g., a CAN bus, as an entry condition, which signal does not represent any valid message (or procedure call) according to the corresponding data-bus specification. The signals satisfying the entry condition are selected so that they cannot occur at all in a corresponding data-bus network according to specification. In addition, the signal satisfying the entry condition for the test mode for a selected control unit is configured so that, when the signal occurs, all of the other control units, e.g., in a vehicle, are reset to an error mode and disconnected from the data bus. In this manner, it is ensured that, during normal operation of the control unit that is connected to further control units via a data bus, the entry condition for the test mode, i.e., the predefined signal, may not occur.

In accordance with the present invention, a method for changing over from a first mode of a control device to a second mode, via a data bus, includes: activating a selected control device; the control device detecting a signal on the data bus; generating a predefined signal on the data bus, the signal having a predefined frequency and a predefined pulse-duty factor; and changing over from the first mode of the control device to the second mode of the control device in response to the control device detecting the predefined signal.

According to an example embodiment of the present invention, the change-over between the two modes of a selected control device occurs during an initialization phase of the control device, e.g., within one second, after the control device detects the predefined signal. Furthermore, the control device conducts a self-test after it is activated. In this manner, it is advantageously ensured that the change-over to the second mode occurs soon after the detection of the predefined signal as an entry condition, and that, in addition, the control device is already checked for its general functionality.

According to another example embodiment of the present invention, the predetermined second mode is a test mode for checking and/or programming the control device, and the access security is provided after the changeover to the predetermined second mode, in order to be able to re-program preset parameters of the control device, which may be stored in a programmable memory, e.g., on an EEPROM. The advantage of this is that the control device is programmable after passage through a security measure, which protects against unauthorized access to predefined control-unit parameters.

According to another example embodiment of the present invention, the access security is provided using the seed & key authentication method. This method provides a high level of security for the authorization of access to core functions of the control unit.

According to another example embodiment of the present invention, the predefined signal for a selected control device is changed by other control devices which are coupled to the common data bus and activated, which means that the predefined signal may not be detected by the selected control device, and therefore, a change-over to the predetermined second mode does not occur for the selected control device. Consequently, it is advantageously ensured that a changeover to the predetermined second mode may only occur when no other control unit, apart from the selected control unit to be tested or checked, is coupled to the data bus.

According to another example embodiment of the present invention, communication is carried out via a data bus in the form of a CAN bus. The CAN bus is widely used in the automotive industry and is distinguished in that it has a suitable specification for this area of application.

According to another example embodiment of the present invention, a change-over to the predetermined second mode occurs when a predefined number of clock-pulse periods of the predefined signal, e.g., at least 16 clock-pulse periods or at least 32 clock-pulse periods, is measured. This measure provides additional security against unwanted or unintended change-over into the predetermined second mode.

According to another example embodiment of the present invention, the predefined signal for changing over the control device from the first mode to the second mode is supplied by a testing device to the data bus for a predefined period of time, until the predefined signal is detected by the control device, and the control device may be activated at the same time as the predefined signal is applied via a switching device. This provides an additional safety measure since the control device is able to receive the predefined signal only for the predefined period of time after the control device has been activated.

According to another example embodiment of the present invention, the control device to be changed over from the first mode to the second mode has a supply-voltage terminal, a reference-potential terminal, a CAN-bus high terminal, and a CAN-bus low terminal, and the control device may be, e.g., a motor-vehicle control unit.

DETAILED DESCRIPTION

Figure 1:
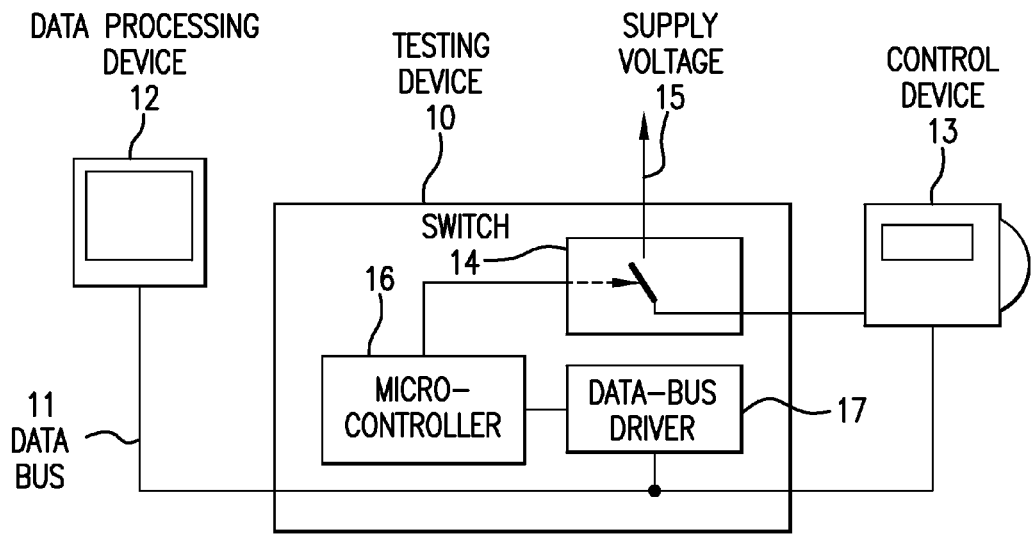
FIG. 1 show a schematic block diagram of a testing device according to an example embodiment of the present invention.

FIG. 1 shows a testing device 10, which is connected to a data-processing device 12, e.g., a PC, via a data bus 11. Testing device 10 is also connected to a control device 13, e.g., a motor-vehicle control unit, via data bus 11, the motor-vehicle control unit being able to be tested with the aid of testing device 10 and data-processing device 12. Testing device 10 has a switching device 14, e.g., a bipolar transistor, via which control device 13 may be connected to a supply voltage 15, for example 14.5 V. Switching device 14 is coupled to a further control device 16, e.g., a micro-controller. Micro-controller 16 is connected to a data-bus driver device 17, e.g., a CAN driver, which is coupled to data bus 11.

In order to reset the control device 13, e.g., a sensor control unit (SCU), from a first mode, e.g., a standard operating mode, to a predetermined second mode, e.g., a manufacturer test mode, an entry condition must be fulfilled. This entry condition is generated in testing device 10 in the form of a predefined signal, which has a predefined frequency and a predefined pulse-duty factor, for example. The predefined signal is applied to data bus 11 as an entry condition, the predefined signal being detected by the control device 13 after it has been activated by the switching device 14. If the predefined signal is recognized as an entry condition, i.e., detected by control device 13, then control device 13 goes into the predetermined second mode, i.e., the manufacturer test mode. Otherwise, a standard operating mode is implemented by the activated control device 13.

The entry into the predetermined second mode should be made possible only during a manufacturer test at the factory and under no circumstances during standard operation, e.g., during the normal operation of a vehicle. Since data bus 11 is used as an interface both for communicating with other components or control units during standard operation in a car and during a manufacturer test, it must be ensured that the entry condition, i.e., the predefined signal, may not occur during the data-bus operation in connection with standard vehicle operation. This may be achieved in that the frequency or the pulse-duty factor, i.e., the ratio of high time to low time (duty cycle), of the predefined signal that satisfies the entry condition is selected to violate the operation specifications of the data bus 11, e.g., the CAN specifications.

According to the example embodiment shown in FIG. 1, the predefined signal is generated with the aid of a micro-controller 16. In order to change over the control device 13 to the predetermined second mode, the predefined signal is applied to data bus 11 as an entry condition during the initialization or boot operation, and consequently applied to control unit 13. In the initial state, switching device 14 is opened, and there is no connection to voltage supply 15, which means the predefined signal is not applied to data bus 11 by the circuit including the micro-controller 16 and the data-bus driver device 17.

With the aid of a predetermined application, a start command is transmitted by the data-processing device 12 to the testing device 10. The testing device 10 then applies the predefined signal, which satisfies the entry condition, to data bus 11 and, e.g., simultaneously, switches on the voltage supply 15 for the control device 13 via the switching device 14. After a predefined time, e.g., 2 seconds, the predefined signal is stopped and no longer transmitted by the testing device 10 to the data bus 11. Thus, control unit 13 runs through an initialization phase; i.e., the control unit 13 (as a test specimen) boots up and recognizes the predefined signal as a satisfactory entry condition, and enters the predetermined second mode, e.g., a manufacturer test mode, after a successful authentication, e.g., via a seed & key method. The manufacturer test software is run on data-processing device 12, and communication with control device 13 occurs via data bus 11.

So-called bit-stuffing is used in the case of CAN communication via a CAN bus 11. This means that, at the latest, a negated bit is inserted after 5 equivalent bits, in order to ensure the synchronization of the different subscribers on a data bus. An ERROR frame has 6 dominant bits having a low level, i.e., a binary value of zero, which violates the bit-stuffing rule. The maximum number of dominant bits on the data bus occurs when a bus subscriber detects a local error and answers with an ERROR frame having 6 dominant bits. Assuming that other bus subscribers do not detect the error directly, they respond with an additional ERROR frame. Thus, the result is a maximum number of 12 dominant bits, which are possible according to the CAN specification.

Following the CAN specification, generally 11, but at least 8, recessive bits are provided on the dominant bits of the ERROR frame in the case of an overload frame on the CAN bus. The result is the following conditions for violating the CAN specification, which represents an option for indicating an entry condition according to the present invention:

$$t_{Low} > 12 \cdot t_{Bit}$$

$$t_{High} < 8 \cdot t_{Bit},$$

where $t_{Bit}=1/($baud rate$)$. The baud rate is a variable specific to the manufacturer. However, since in the case of certain control units time-critical data of a predetermined scope must be transmitted, the present exemplary embodiment assumes that a data-transmission rate of less than 125 kbps is not feasible. This is the case, for example, when the control device is a distance-warning radar control unit for a motor vehicle, i.e., when time-critical data are involved. If one maintains a spacing of one order of magnitude from the exemplary, minimum data-transmission rate of, for example, 125 kbps, i.e., if one selects a minimum baud rate of, e.g., 10 kbps (worst-case or slowest-case scenario), then a large safety distance is consequently ensured. As a result:

$t_{Low} > 12 \cdot 1/10000 \text{ bps} = 1.2 \text{ ms}$ $t_{High} < 8 \cdot 1/10000 \text{ bps} = 0.8 \text{ ms}.$ A signal of this frequency may not be produced on a CAN bus having a baud rate of at least 10 kbps. Such a predefined signal on the CAN bus results in non-selected bus subscribers or control devices, i.e., bus subscribers or control devices other then the one selected to be tested, shifting to an ERROR-PASSIVE or BUS-OFF state after a maximum of 16 periods at 10 kbps. Therefore, self-locking occurs, since the predefined signal having the above-described characteristics may only be applied to the CAN bus when only the selected control device 13 to be tested is connected to the data bus 11.

In the case of baud rates between 2 kbps and 10 kbps, bit sequences which correspond to the predefined signal for a short time and do not violate the CAN specification are theoretically conceivable. By increasing the clock-pulse periods to be detected to greater than 32 clock-pulse periods, a random occurrence of the predefined signal, i.e., a random occurrence of a signal satisfying the entry condition, may be completely eliminated. In this case, at the latest the 33rd period is deformed by a (EOF+IFS) field of the data telegram, and consequently, the entry condition is recognized as being invalid.

According to an example embodiment of the present invention, the predefined signal having the predefined frequency and the predefined pulse-duty factor is applied to control device 13 as of the switching-on of supply voltage 15. The predefined signal is then applied until control device 13 has detected, for example, 16 clock-pulse periods or 32 clock-pulse periods of the predefined signal after its initialization and, for example, after a self-test of control device 13. As soon as an incorrect or missing signal edge occurs during the detection of the predefined signal, a standard operating mode is initiated for the control device 13, and no change to the predetermined second mode (manufacturer test mode) is made.

As soon as the predefined signal is recognized by the control device 13 as a valid entry condition, control device 13 expects that communication with the data-processing device 12 is being established. According to an example embodiment of the present invention, the establishing of the communication should occur within a defined period of time, by way of a predefined message on the CAN bus. If a different message, a TIME-OUT (i.e., the expiration of the time), or an ERROR frame is identified, the entry into the predetermined mode is prevented and a reset is carried out. In the case of established communication between the control device 13 and the data-processing device 12, a diagnostic sequence having a predetermined diagnostic mode, e.g., "end of line system supplier mode" or "system supplier specific" is then opened.

In order to allow access to additional protected parameters, and/or to be able to serve a loading function, access security measures may be provided, which measures may involve the use of a seed & key method. In a seed & key method, the data-processing device 12 requests a random number, and during this request, it specifies both a password and a masking code number. If the password and/or the masking code number is not valid, then the authentication process is aborted. If the password and masking code number are valid, then the data-processing device 12 calculates a cipher key on the basis of the random number and transmits it to the control device 13. The control device 13 compares the received cipher key to the self-generated cipher key and aborts the process if the cipher keys differ from each other. If the two cipher keys are identical, then access to the loader functionality, i.e., the configuration of control device 13, is granted, e.g., via parameters that are stored on an EEPROM.

According to the present invention, a control device 13 may be tested or reconfigured by an authorized manufacturer, with the control device requiring only 4 terminals: supply voltage 15; reference potential or ground (not shown); a CAN-high connection; and a CAN-low connection. A predefined signal may be transmitted via these 4 connector pins, the predefined signal satisfying an entry condition which is based not only on a software algorithm, but also on physical quantities (frequency and pulse-duty factor, for example). Additional components of control device 13 are not needed for implementing the present invention, since the predefined signal may be implemented on a standard interface.

Figure 2:
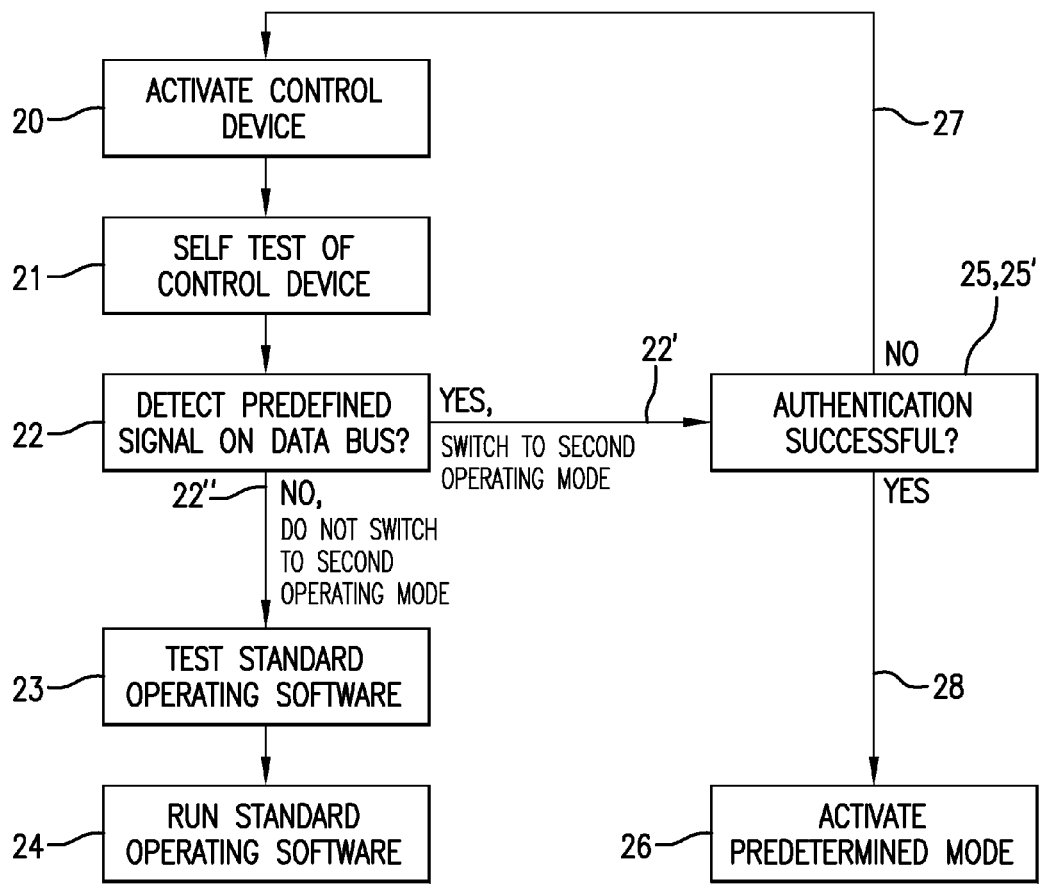
FIG. 2 is a flowchart illustrating an example embodiment of a method according to the present invention.

FIG. 2 shows a flow chart illustrating example embodiment of the method according to the present invention. First of all, the control device 13 shown in FIG. 1 is activated or switched on in step 20. This entails an initialization. A self-test (step 21) of the control device subsequently occurs in response to the initialization or activation of the control device in step 20. This is followed by determination (step 22) of whether the predefined signal is detected on data bus 11. If the predefined signal is not detected on the data bus 11 (indicated by decision path 22"), then a test of the standard operating software (step 23) is conducted, which step is followed by execution of the standard operating software on the control device 13 (step 24). However, if the predefined signal is detected by the control device (indicated by decision path 22'), then access to predefined, unprotected information may be given, i.e., there is the possibility of changing certain parameters (step 25). In this connection, access protection may be additionally provided (step 25'), e.g., by the seed & key authentication method, in order to be able to change protected parameters. If the authentication step 25' is completed successfully (indicated by the decision path 28), then the predetermined second mode (step 26) is activated. If the authentication step 25' is not completed successfully (e.g., because of incorrect inputs), then a software reset occurs (indicated by decision path 27), which loops the method back to the initialization or activation phase (step 20) of the control device.

Although the present invention has been described above on the basis of exemplary embodiments, the present invention is not limited to the exemplary embodiments, but may be modified in various ways. For example, in spite of the reference to the CAN bus having a corresponding specification, other data busses may be used for implementing the method according to the present invention. In addition, the above-mentioned baud rates, frequencies and pulse-duty factors, and the corresponding high and low phases of signals, are to be viewed as exemplary. Furthermore, the schematic illustration shown in FIG. 1 only represents one simplified, exemplary embodiment of the present invention.

What is claimed is:

1. A method for switching between a first operating mode and a second operating mode of a target control device connected to a data bus, the method comprising:
    activating the target control device;
    generating, using a test device, a predefined signal to be transmitted on the data bus, the predefined signal having a predefined frequency and a predefined pulse-duty factor; and switching from the first operating mode of the target control device to the second operating mode of the target control device in response to the target control device detecting the predefined signal transmitted on the data bus;

wherein the predefined signal is changed if at least one other control device is active and coupled to the data bus, whereby the predefined signal is not detected by the target control device and the switching to the second operating mode of the target control device does not occur.

2. The method as recited in claim 1, wherein the switching occurs after the target control device detects the predefined signal during an initialization phase of the target control device.

3. The method as recited in claim 2, wherein the switching occurs within approximately one second after the target control device detects the predefined signal.

4. The method as recited in claim 2, further comprising:
performing a self-test by the target control device after the activation.

5. The method as recited in claim 1, further comprising:
performing an access-security authentication after the switching to the second operating mode;
wherein the second operating mode is a test mode for at least one of checking, programming and reprogramming the target control device, and wherein reprogramming of preset parameters of the target control device stored on a programmable memory is performed after a successful completion of the access-security authentication.

6. A method for switching between a first operating mode and a second operating mode of a target control device connected to a data bus, the method comprising:
activating the target control device;
generating, using a test device, a predefined signal to be transmitted on the data bus, the predefined signal having a predefined frequency and a predefined pulse-duty factor; and
switching from the first operating mode of the target control device to the second operating mode of the target control device in response to the target control device detecting the predefined signal transmitted on the data bus;
performing an access-security authentication after the switching to the second operating mode;
wherein the second operating mode is a test mode for at least one of checking, programming and reprogramming the target control device, and wherein reprogramming of preset parameters of the target control device stored on a programmable memory is performed after a successful completion of the access-security authentication, and
wherein the access-security authentication includes a seed-and-key authentication.

7. The method as recited in claim 5, wherein the predefined signal is applied to the data bus by the testing device for a predefined period of time, and wherein the target control device is activated by a switching device associated with the testing device at the same time as the predefined signal is applied to the data bus.

8. The method as recited in claim 5, wherein the switching to the second operating mode occurs after at least 16 clock-pulse periods of the predefined signal.

9. The method as recited in claim 5, wherein the data bus is a CAN bus.

10. The method as recited in claim 1, wherein the predefined signal is applied to the data bus by the testing device for a predefined period of time, and wherein the target control device is activated by a switching device associated with the testing device at the same time as the predefined signal is applied to the data bus.

11. The method as recited in claim 1, wherein the switching to the second operating mode occurs after at least 16 clock-pulse periods of the predefined signal.

12. A method for switching between a first operating mode and a second operating mode of a target control device connected to a data bus, the method comprising:
activating the target control device;
generating, using a test device, a predefined signal to be transmitted on the data bus, the predefined signal having a predefined frequency and a predefined pulse-duty factor; and
switching from the first operating mode of the target control device to the second operating mode of the target control device in response to the target control device detecting the predefined signal transmitted on the data bus;
performing a self-test by the target control device after the activation; and
performing an access-security authentication after the switching to the second operating mode;
wherein the second operating mode is a test mode for at least one of checking, programming and reprogramming the target control device, and wherein reprogramming of preset parameters of the target control device stored on a programmable memory is performed after a successful completion of the access-security authentication,
wherein the switching occurs after the target control device detects the predefined signal during an initialization phase of the target control device.

13. The method as recited in claim 12, wherein the access-security authentication includes a seed-and-key authentication.

14. The method as recited in claim 12, wherein the predefined signal is changed if at least one other control device is active and coupled to the data bus, whereby the predefined signal is not detected by the target control device and the switching to the second operating mode of the target control device does not occur.

15. The method as recited in claim 12, wherein the switching to the second operating mode occurs after at least 16 clock-pulse periods of the predefined signal.

16. The method as recited in claim 1, wherein the switching to the second operating mode occurs after at least 16 clock-pulse periods of the predefined signal.

* * * * *

UNITED STATES PATENT AND TRADEMARK OFFICE
CERTIFICATE OF CORRECTION

PATENT NO. : 7,664,581 B2 Page 1 of 1
APPLICATION NO. : 10/959439
DATED : February 16, 2010
INVENTOR(S) : Wackerl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1267 days.

Signed and Sealed this

Thirtieth Day of November, 2010

David J. Kappos
*Director of the United States Patent and Trademark Office*